United States Patent [19]
Faigle et al.

[11] Patent Number: 5,590,906
[45] Date of Patent: Jan. 7, 1997

[54] VEHICLE OCCUPANT RESTRAINT INFLATOR

[75] Inventors: Ernst M. Faigle, Imlay City; John H. Semchena, Royal Oak; Richard J. Thompson, Imlay City, all of Mich.

[73] Assignee: TRW Vehicle Safety Systems Inc., Lyndhurst, Ohio

[21] Appl. No.: 579,450

[22] Filed: Dec. 27, 1995

Related U.S. Application Data

[63] Continuation of Ser. No. 135,786, Oct. 13, 1993, abandoned.

[51] Int. Cl.[6] ................................................ B60R 21/28
[52] U.S. Cl. ....................... 280/741; 280/736; 280/737; 222/3
[58] Field of Search ............................ 280/728.1, 736, 280/737, 741; 222/3, 5; 102/530, 531; 422/164–167

[56] References Cited

U.S. PATENT DOCUMENTS

| | | | |
|---|---|---|---|
| 3,567,245 | 3/1971 | Ekstrom | 280/737 |
| 4,444,109 | 4/1984 | Gifford, Jr. | 102/200 |
| 4,483,461 | 11/1984 | Igarashi | 222/3 |
| 4,785,158 | 11/1988 | Gaul | 219/121.14 |
| 5,131,680 | 7/1992 | Coultas et al. | 280/741 X |
| 5,263,740 | 11/1993 | Frey et al. | 280/737 |
| 5,344,186 | 9/1994 | Bergerson et al. | 222/5 X |
| 5,348,344 | 9/1994 | Blumenthal et al. | 280/737 |

*Primary Examiner*—Christopher P. Ellis
*Attorney, Agent, or Firm*—Tarolli, Sundheim, Covell, Tummino & Szabo

[57] ABSTRACT

An inflator for inflating a vehicle occupant restraint, such as an air bag, includes a container (18) having a stored mixture of gases including a primary gas for inflating the air bag and a combustible gas. An actuator assembly (20) opens the container (18) and ignites the combustible gas as it flows toward the vehicle occupant restraint. Igniting the combustible gas creates a combustion reaction external to the container (18) which heats the primary gas as it flows toward the air bag. A combustion arrestor (22) minimizes the propagation of the combustion reaction into the container (18).

22 Claims, 4 Drawing Sheets

VEHICLE OCCUPANT RESTRAINT INFLATOR

This application is a continuation of application Ser. No. 08/135,786 filed on Oct. 13, 1993, now abandoned.

FIELD OF THE INVENTION

The present invention relates to a new and improved apparatus for use in inflating a vehicle occupant restraint, such as an air bag.

BACKGROUND OF THE INVENTION

An air bag is inflated to restrain a vehicle occupant during a vehicle collision. The air bag is inflated by an inflation fluid from an inflation fluid source. Upon the occurrence of vehicle deceleration indicative of a collision, the inflation fluid is directed into the air bag from the inflation fluid source.

One known inflation fluid source is a container containing a combustible mixture of gases. Combustion of the gases in the container increases the pressure in the container. Thus, the container needs to be strong enough to withstand the increase in pressure.

SUMMARY OF THE INVENTION

The present invention provides a new and improved apparatus for inflating a vehicle occupant restraint, such as an air bag. The apparatus includes a container having a mixture of gases. The mixture of gases includes a primary gas for inflating the vehicle occupant restraint and a combustible gas which, when ignited, heats the primary gas. The apparatus also includes a means for directing gas from the container toward the vehicle occupant restraint. The apparatus further includes a means for igniting the combustible gas as it flows toward the vehicle occupant restraint to establish combustion external of the container which heats the primary gas as it flows toward the vehicle occupant restraint. Also, the apparatus includes a combustion arrestor for minimizing the propagation of the combustion into the container.

The apparatus of the present invention is advantageous in that the burning of the combustible gas external of the container results in minimizing the pressure acting on the walls of the container having the mixture of gases. The container having the mixture of gases may thus have relatively thin walls, which reduces the weight and the external dimensions of the container.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF PREFERRED EMBODIMENT

Figure 1:
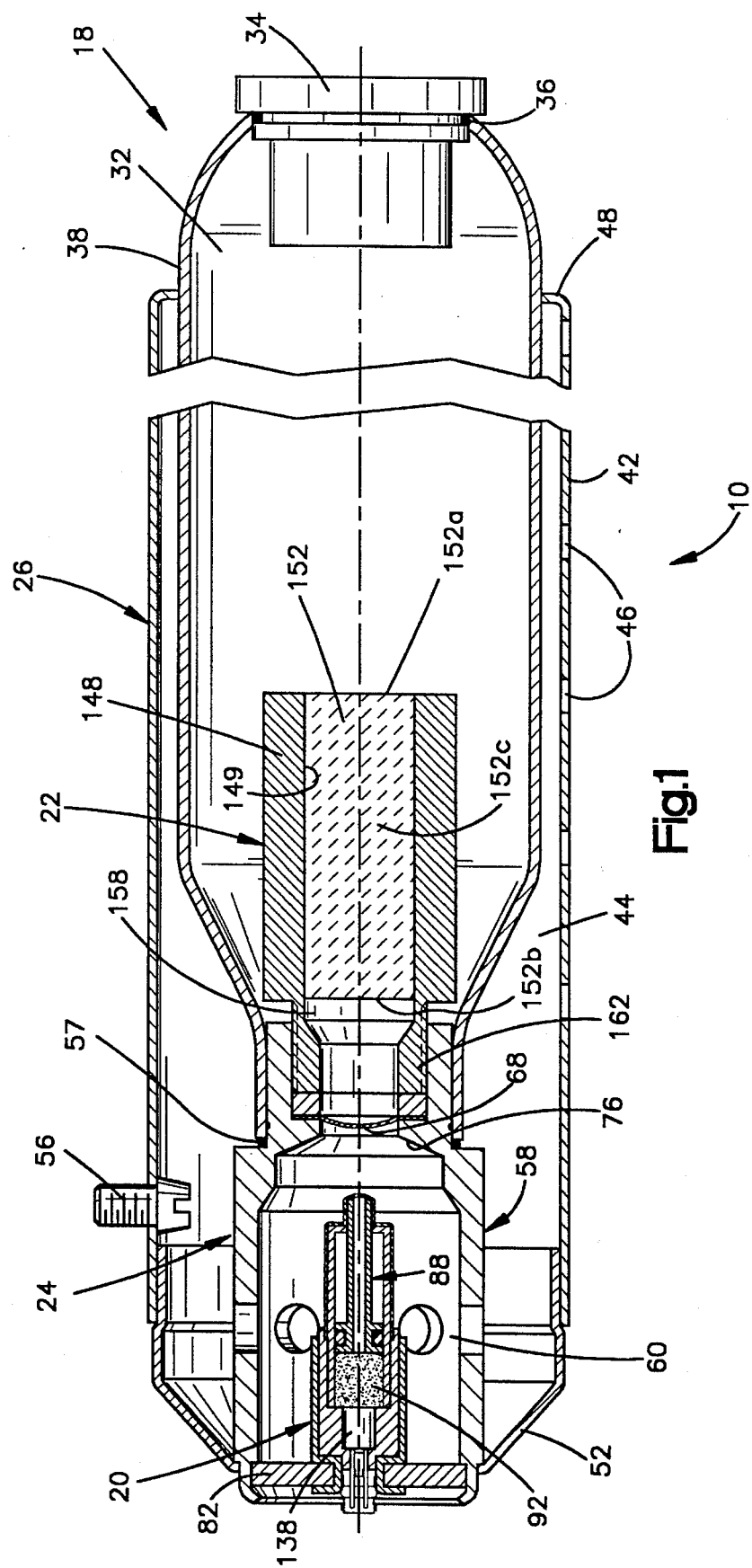
FIG. 1 is a sectional view of an air bag inflator embodying the present invention.

The present invention relates to an inflator for an inflatable vehicle occupant restraint, such as an air bag (not shown). The present invention is applicable to various inflator constructions for various vehicle occupant restraint systems. An air bag inflator 10 embodying the present invention is illustrated in FIG. 1.

The inflator 10 includes a container 18 for storing a combustible mixture of gases, an actuator assembly 20 for opening the container 18 and igniting the combustible mixture of gases, a combustion arrestor 22 for minimizing propagation into the container 18 of the combustion of the gases, a manifold assembly 24 and a diffuser 26. The manifold assembly 24 is secured to one end of the container 18 and projects both axially into and axially away from the container 18. The container 18 and the manifold assembly 24 are both encircled by the cylindrical diffuser 26, which is larger in diameter than the container 18. The diffuser 26 also extends axially substantially the entire length of the manifold assembly 24 and a significant portion of the length of the container 18. The actuator assembly 20 is secured to the left end (as viewed in FIG. 1) of the manifold assembly 24. The combustion arrestor 22 is secured to the right end (as viewed in FIG. 1) of the manifold assembly 24 and projects axially into the container 18.

The container 18 includes a generally cylindrical one-piece wall 38 which defines a generally cylindrical chamber 32. The one-piece wall 38 could be of any suitable dimensions. Also, the wall 38 of the container 18 may be made of any suitable metal, such as a steel alloy or an aluminum alloy, as long as the material is impervious to the mixture of gases stored in the container 18.

An end cap 34 extends through an opening at an end of the container 18 opposite from the manifold assembly 24 and is connected to the container 18 by a suitable weld 36. The end cap 34 includes a passage (not shown) through which the combustible mixture of gases is conducted into the chamber 32. Once the chamber 32 has been filled with the combustible mixture of gases at a desired pressure, the passage is closed. The end cap 34 also includes a conventional pressure switch (not shown) from which the pressure of the mixture of gases in the chamber 32 can be monitored to alert a passenger in the vehicle if the pressure in the chamber 32 drops below a predetermined pressure.

The stored mixture of gases in the chamber 32 includes a primary gas, which comprises the majority of the gas for inflating the vehicle occupant restraint, and a combustible gas which, when ignited, heats the primary gas. The mixture of stored gases in the chamber 32 is in a homogeneous gaseous state. The primary gas preferably includes an oxidizer gas for supporting combustion of the combustible gas and an inert gas for inflating the vehicle occupant restraint. The primary gas may include air or an inert gas or a mixture of air and an inert gas. The inert gas may be nitrogen, argon or a mixture of nitrogen and argon. Preferably, the primary gas includes a mixture of air and nitrogen. The oxidizer gas is the oxygen in the air. The combustible gas is hydrogen, methane or a mixture of hydrogen and methane. Preferably, the combustible gas is hydrogen. A typical composition of the mixture of gases in the chamber 32 is about 14% by volume hydrogen and 86% by volume air and nitrogen. The mixture of gases is stored in the chamber 32 of the container 18 at a pressure of approximately 2000 psi.

The diffuser 26 is mounted on the outside of the container 18 and includes a cylindrical diffuser tube 42. The cylindrical diffuser tube 42 has an annular, radially inwardly directed lip 48 at one end. The lip 48 tightly engages a cylindrical outer side surface of the wall 38 of the container 18. An end cap 52 is welded to the end of the diffuser tube 42 opposite from the inturned lip 48. The end cap 52 is connected by a suitable weld to an outer end portion of the manifold assembly 24. A mounting stud 56 is connected with the diffuser tube 42 adjacent to the end cap 52. The mounting stud 56 is used to mount the air bag inflator 10 to a reaction canister (not shown) which can be mounted at a desired location in a vehicle. A diffuser chamber 44 is defined by the diffuser tube 42, the container wall 38 and the outer walls of the manifold assembly 24. Openings 46 in the diffuser tube 42 direct gas out of the diffuser chamber 44 to inflate the vehicle occupant restraint.

The manifold assembly 24 is secured to one end of the container 18 opposite the end cap 34 by a suitable weld 57. A portion of the manifold assembly 24 that projects into the chamber 32 of the container 18 supports the combustion arrestor 22. A portion of the manifold assembly 24 outside the container 18 supports the actuator assembly 20.

Figure 2:
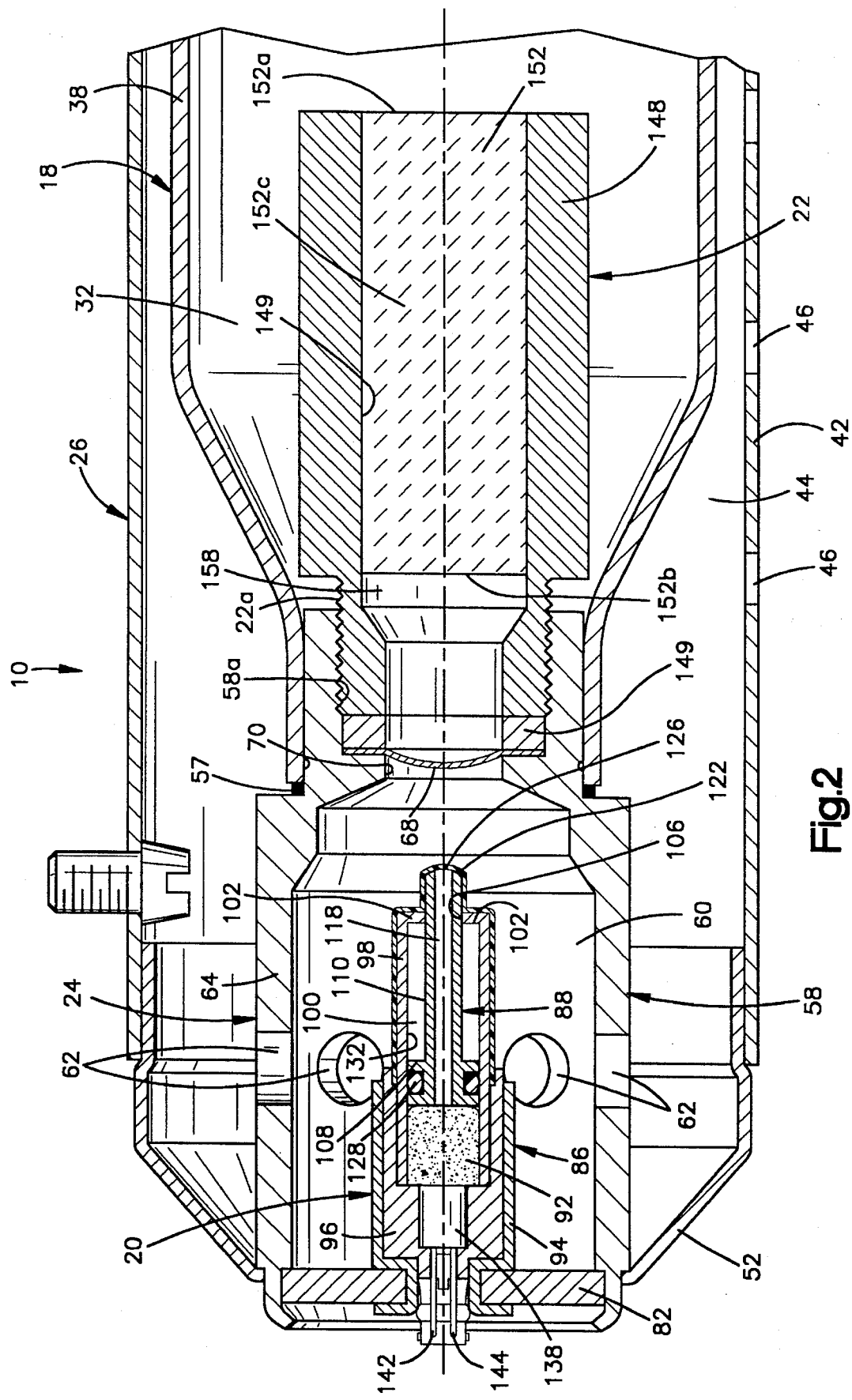
FIG. 2 is an enlarged fragmentary sectional view of a portion of the inflator of FIG. 1.

The manifold assembly 24 (FIG. 2) includes a generally cylindrical metal manifold plug 58. The manifold plug 58 is hollow and has a generally cylindrical interior cavity 60. Circular outlet openings 62 are disposed in a circular array in a cylindrical side wall 64 (FIG. 2) of the manifold plug 58. The right end (as viewed in FIG. 2) of the manifold plug 58 extends through an opening in the container wall 38 and is secured to the wall 38 of the container 18 by the weld 57.

A circular passage extends through the right end of the manifold plug 58 and communicates with the cavity 60. A portion of the wall defining the passage is internally threaded at 58a. Another portion 70 of the wall defining the passage has a smaller internal diameter than the threaded portion 58a of the wall. The portion of the passage defined by the wall portion 70 communicates the threaded passage portion 58a with the cavity 60. A burst disk 68 extends across the section of the passage defined by the small diameter wall portion 70. The burst disk 68 is secured to the manifold plug 58 and blocks the flow of gas from the container 18 through the section of the passage defined by the small diameter wall portion 70. The burst disk 68 has a circular domed or bulged central portion. The central portion is preferably divided into equal segments by score lines which extend radially outward from the center of the burst disk 68.

The left end of the cavity 60 of the manifold plug 58 (FIG. 2) is closed by a circular end wall 82. The actuator assembly 20 is mounted on the end wall 82. The end wall 82 supports the actuator assembly 20 with its longitudinal central axis coincident with the central axis of the manifold plug cavity 60 and the burst disk 68.

The actuator assembly 20 (FIG. 2) is operable to rupture the burst disk 68 (FIG. 3) and to ignite the combustible gas in the mixture of gases. The actuator assembly 20 includes a cylindrical housing 86. The housing 86 includes a generally cylindrical metal outer housing member 94, a cylindrical casing 96 and an inner housing member 98. The outer housing member 94 is secured to the end wall 82 of the manifold plug 58 and is disposed in a coaxial relationship with the burst disk 68. The casing 96 is disposed within the outer housing member 94 and extends around an end portion of the cylindrical metal inner housing member 98. The casing 96 electrically insulates the metal inner housing member 98 from the metal outer housing member 94. The casing 96 is formed of glass reinforced nylon. However, the casing 96 may be made of a variety of plastics.

The inner housing member 98 has a cylindrical chamber 100 in which a piston 88 and a pyrotechnic charge 92 are disposed. The inner housing member 98 has an annular end flange 102 which defines a circular opening 106 in the housing member 98. The piston 88 has a cylindrical head end portion 108. A smaller diameter, cylindrical piston rod portion 110 of the piston 88 extends away from the head end portion 108. A cylindrical central passage 118 is coaxial with and extends through the head end portion 108 and the piston rod portion 110 of the piston 88. An annular O-ring 128 is disposed on the head end portion 108 of the piston 88 and engages and seals against a cylindrical inner side surface 132 of the inner housing member 98. The cylindrical piston rod portion 110 has a pointed tip on its outer end portion 122, which extends through the opening 106.

A generally cylindrical end cap 126 encloses the outer end portion 122 of the piston rod 110 and an end portion of the inner housing member 98. The end cap 126 is secured between the casing 96 and inner housing member 98. The end cap 126 is vacuum formed of polypropylene and blocks the piston passage 118 to prevent moisture or contaminants from entering the piston passage 118. Also, the end cap 126 electrically insulates the outer end portion 122 of the piston rod 110 and the end portion of the inner housing member 98.

The pyrotechnic charge 92 is disposed adjacent the head end portion 108 of the piston 88 and in the cylinder chamber 100. The pyrotechnic charge 92 could have many different compositions. A squib 138 is located adjacent to the pyrotechnic charge 92. Two electrically conductive pins 142 and 144 are connected with the squib 138. The pins 142 and 144 extend through the casing 96 and through an opening in the end of the outer housing member 94 adjacent to the wall 82. The pins 142 and 144 provide a path for electrical current to actuate the squib 138.

The combustion arrestor 22 is disposed in a coaxial relationship with the burst disk 68 and the actuator assembly 20. The combustion arrestor 22 includes a cylindrical housing 148 of a suitable material such as a stainless steel alloy. The combustion arrestor 22 is located in the container 18 and is secured to the right end of the manifold assembly 24 as viewed in the drawings. The housing 148 has an externally threaded end portion 22a. The externally threaded end portion 22a of the housing 148 is screwed into the internal threads at 58a of the manifold plug 58. A suitable gasket 149 is located between the threaded end portion 22a of the housing 148 and the burst disc 68.

The housing 148 of the combustion arrestor 22 has a cylindrical chamber 149 which extends axially through the housing 148. A combustion barrier material 152 is located in the chamber 149. The chamber 149 has a generally cylindrical chamber portion 158 located between the barrier material 152 and the burst disk 68.

The barrier material 152, which is disposed within the chamber 149, is cylindrical. The barrier material 152 includes an entry section 152a, an exit section 152b and a middle section 152c. The entry section 152a is an end portion of the barrier material 152 located furthest in the chamber 32 of the container 18. The exit section 152b is an end portion of the barrier material 152 adjacent to the chamber portion 158. The exit section 152b and the entry section 152a are interconnected by the middle section 152c and are in a coaxial relationship with the burst disk 68.

The barrier material 152 may take many forms. It is porous or has spaced gaps making it permeable to the mixture of gases in the container 18. The barrier material may be secured in the housing 148 in any suitable manner.

The barrier material 152 of the combustion arrestor 22 may be a mass of stainless steel wool or stainless steel mesh. The stainless steel wool employed to construct the barrier material is typically about 27 pounds per cubic feet and is press fit into the chamber 149. The stainless steel mesh is also press fit into the chamber 149. The stainless steel mesh is helically wound, layer upon layer, as are arrestors used in welding torches and sold by G. W. Lisk Co. under Model No. L5252.

Since the barrier material is porous, the gases in the chamber 32 of the container 18 diffuse through the barrier material 152 and into the chamber portion 158 where they are contained by the intact burst disk 68.

Figure 3:
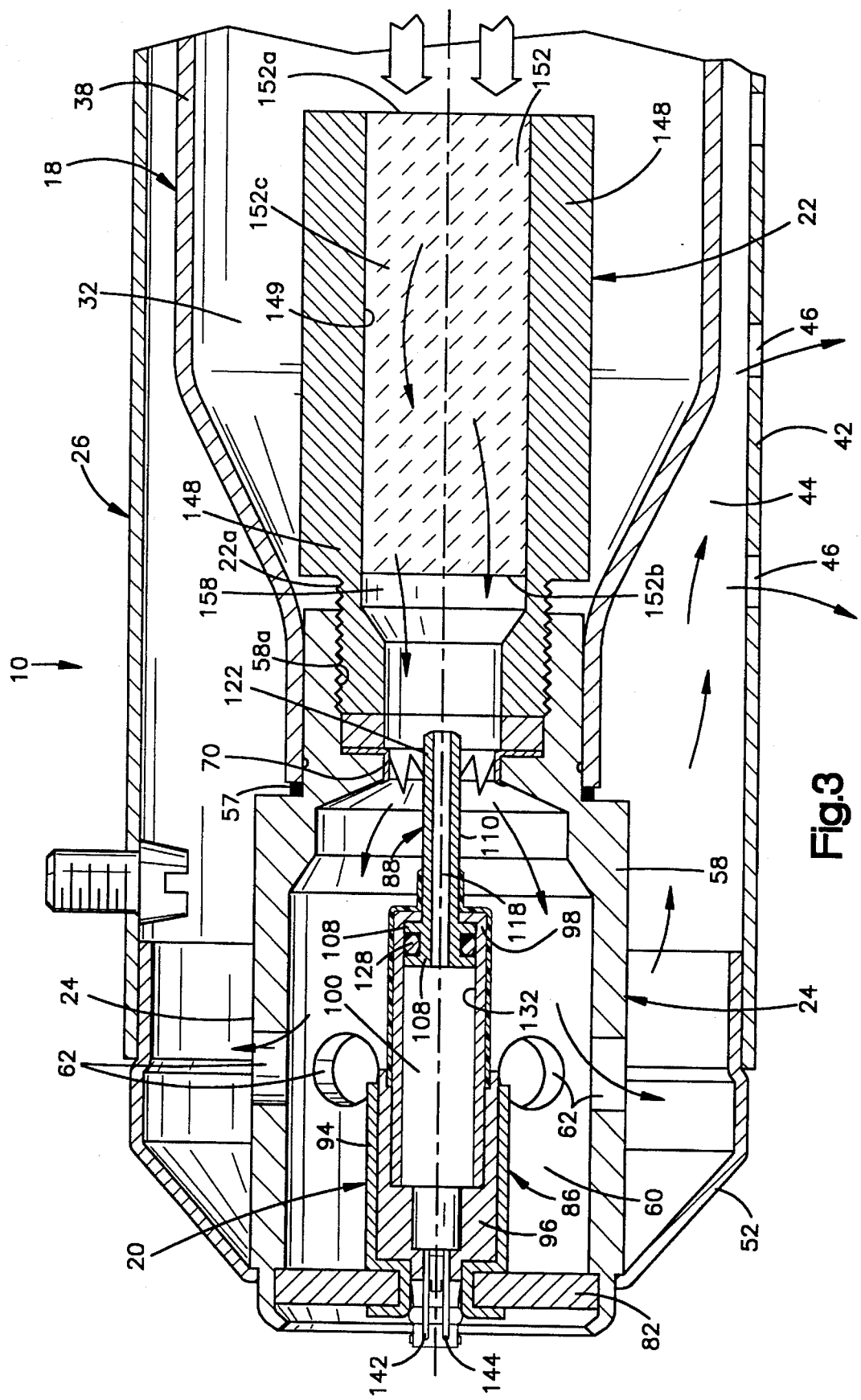
FIG. 3 is an enlarged fragmentary sectional view similar to FIG. 2 but illustrating parts of the inflator in a different position.

Upon the occurrence of sudden vehicle deceleration, such as occurs in a collision a deceleration sensor (not shown) of any known and suitable construction completes an electric circuit to permit electrical current to flow to the pins 142 and 144 of the actuator assembly 20. The electrical current transmitted to the pins 142 and 144 causes the squib 138 to ignite the pyrotechnic charge 92. The hot combustion products generated by burning of the pyrotechnic charge 92 push against the head end portion 108 of the piston 88 to move the piston 88 in the cylindrical chamber 100 from a retracted position (FIG. 2) to an extended position (FIG. 3).

As the piston 88 moves, the end cap 126 is ruptured by the pointed tip on the outer end portion 122 of the piston rod portion 110. Movement of the piston 88 causes the outer end 122 of the piston rod portion 110 to move through the circular opening 106. The pointed tip of the end 122 of the piston 88 strikes at or near center of the burst disk 68 and ruptures the burst disk 68. The pressure in the container 18 then deforms the burst disk 68 axially outward (FIG. 3) as the stored gases escape from the chamber 32 of the container 18 through the combustion arrestor 22 and chamber 158.

After rupturing the burst disk 68, the piston 88 continues to move axially, under the influence of the combustion products resulting from burning of the pyrotechnic charge 92, to its extended position. The outer end portion 122 of the piston rod portion moves into the chamber portion 158 of the combustion arrestor 22. The head end portion 108 of the piston 88 strikes the end flange 102 of the inner housing member 98 and is blocked against further movement toward the barrier material 152 of the combustion arrestor 22. The outer end portion 122 of the piston 88 stops in the chamber 158 of the combustion arrestor 22 prior to contacting the barrier material 152 of the combustion arrestor 22 (FIG. 3).

As the piston 88 reaches its extended position, flame and a flow of hot combustion products resulting from ignition of the pyrotechnic charge 92 are conducted through the piston passage 118 into the chamber 158 of the combustion arrestor 22. The flame and hot combustion products conducted through the piston passage 118 ignite the combustible gas (hydrogen) in the chamber 158 of the combustion arrestor 22.

With the burst disk 68 ruptured, the mixture of gases in the container 18 continuously flows from the chamber 32 of the container 18. The gases flow into the entry section 152*a*, through the middle section 152*c* and out the exit section 152*b* of the barrier material 152 into the chamber portion 158 of the combustion arrestor 22. Then the mixture of gases flows through the ruptured burst disk 68 and passage 70 and around the end portion 122 of the piston 88, and into the cavity 60 of the manifold plug 58.

The hydrogen gas is ignited as the mixture of gases flows from the chamber 32. The combustible gas (hydrogen) burns at a relatively high temperature and generates heat. The combustible gas burns for approximately 20 milliseconds. This combustion may not be visible and may only be detectable through monitoring of ionization levels. As the combustible gas burns, the combustion reaction is prevented from propagating into the chamber 32 of the container 18 by the barrier material 152 of the combustion arrestor 22 and by the outward gas flow through the barrier material. The combustion is trapped in the barrier material 152 and cannot propagate into the chamber 32. During the burning, the temperature in the combustion arrestor 22 reaches approximately 1000° F.

As the hydrogen gas burns, the primary gas flows past and through the burning hydrogen as the primary gas flows from the chamber 32 of the container 18 and through the combustion arrestor 22 and manifold assembly 24 to inflate the vehicle occupant restraint. The pressure differential between the chamber 32 of the container 18 and the manifold assembly 24 also causes the mixture of gases and flame to flow back toward the vehicle occupant restraint and into the cavity 60 of the manifold assembly 24. Thus, a significant portion of the combustion is external of the container 18. Any portion of the combustion in the container 18 is in the combustion arrestor 22 and/or manifold plug 58.

The primary gas flows from the cavity 60 through the openings 62 into the diffuser chamber 44. The primary gas then flows from the diffuser chamber 44 through the openings 46 to inflate the vehicle occupant restraint. The pressure in cavity 60 will typically reach about 1000 psi during gas flow.

Figure 4:
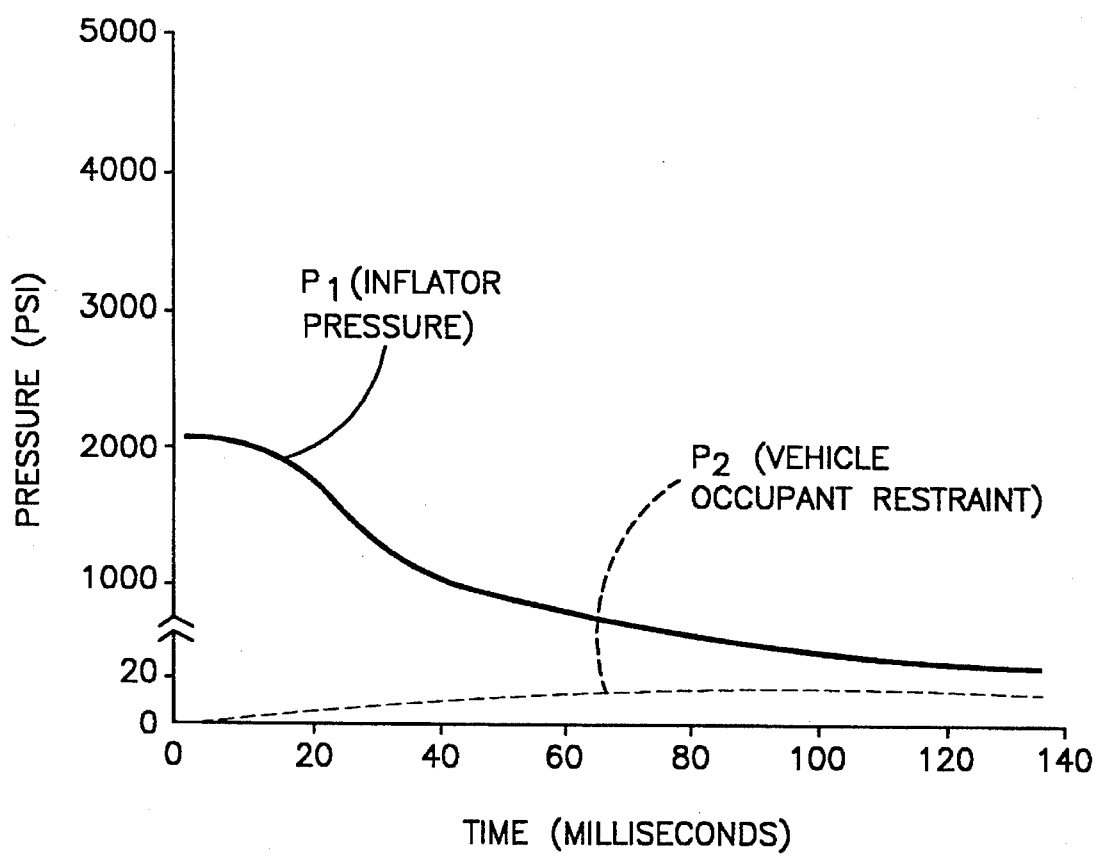
FIG. 4 is a graph illustrating operating characteristics of the inflator of FIG. 1.

FIG. 4 illustrates graphically the relationship between the pressure of the mixture of gases in the chamber 32 of the container 18 and the pressure of the gases in the vehicle occupant restraint during the operation of the inflator 10. The pressure in the chamber 32 is represented in FIG. 4 by the curve $P_1$. The pressure in the vehicle occupant restraint is represented in FIG. 4 by the curve $P_2$. The units for pressure, for curves $P_1$ and $P_2$, are pounds per square inch (psi) and is shown on the vertical axis of FIG. 4. The units for time, for curves $P_1$ and $P_2$, are milliseconds and is shown on the horizontal axis of FIG. 4. At time O, the actuator assembly 20 activates and bursts the burst disk 68, the mixture of gases in the chamber portion 158 of the combustion arrestor 22 is ignited, and the pressurized mixture of gases including the combustible gas and the primary gas in the container 18 begins to flow toward the vehicle occupant restraint. The pressure in the chamber 32 of the container 18 does not rise over the storage pressure of about 2,000 psi after the burst disk 68 bursts and the combustible gas is ignited, as indicated by curve $P_1$. The pressure in the vehicle occupant restraint begins to increase as the gases expand the vehicle occupant restraint, as indicated by curve $P_2$. As the combustion nears completion, the pressure ($P_1$) in the chamber 32 of the container 18 decreases, as the pressure ($P_2$) in the vehicle occupant restraint increases, until the vehicle occupant restraint is fully inflated.

FIG. 4 shows no rise of pressure in the chamber 32 of the container 18 after combustion of the combustible gas. This indicates that the significant portion of combustion occurs external to the chamber 32 of the container 18 and the combustion arrestor 22, and any combustion in the chamber 32 does not raise the pressure in the chamber 32. This demonstrates that the combustible gas burns primarily external to the chamber 32 and heats the primary gas outside the chamber 32 as it passes through the burning combustible gas. Heating of the primary gas outside the chamber 32 allows the thickness of the walls of the container 18 to be minimized since the pressure acting on the walls of the container 18 is minimized.

From the above description of the invention, those skilled in the art will perceive improvements, changes and modifications. For example, the preferred embodiment of the invention describes the mixture of gases in the chamber 32 as being stored in gaseous form. The gases could, however, be stored in liquid or solid form. The gases could also be stored in a form in which they are chemically bonded to other elements and are released from such chemical bonding for combustion. Such improvements, changes and modifications within the skill of the art are intended to be covered by the appended claims.

Having described the invention, the following is claimed:

1. An apparatus for inflating a vehicle occupant restraint such as an air bag, said apparatus comprising:

a container having a mixture of gases including a primary gas for inflating the vehicle occupant restraint and a combustible gas which, when ignited, heats the primary gas;

means for directing the mixture of gases from said container toward the vehicle occupant restraint;

means for igniting the combustible gas as it flows toward the vehicle occupant restraint to create a combustion reaction external to said container past which the primary gas flows; and a combustion arrestor for substantially containing the combustion reaction within said means for directing to minimize the propagation of the combustion reaction into said container.

2. An apparatus as defined in claim 1 wherein said mixture of gases comprises a stored mixture of gases in said container.

3. An apparatus as set forth in claim 2 wherein the primary gas includes air or an inert gas or a mixture of air and an inert gas, wherein the inert gas is selected from the group consisting of nitrogen, argon, and combinations thereof.

4. An apparatus as set forth in claim 3 wherein the primary gas includes an oxidizer gas.

5. An apparatus as set forth in claim 2 wherein the combustible gas is selected from the group consisting of hydrogen, methane and combinations thereof.

6. An apparatus as set forth in claim 2 wherein the combustible gas is hydrogen and the primary gas is air and nitrogen.

7. An apparatus as set forth in claim 4 wherein the primary gas is air and nitrogen, the oxidizer gas is oxygen and the combustible gas is hydrogen.

8. An apparatus as set forth in claim 2 wherein said combustion arrestor includes a housing, said housing being located in said container, and said means for directing the mixture of gases includes a manifold plug extending through a wall of said container and connected to said housing.

9. An apparatus as set forth in claim 8 wherein said combustion arrestor includes a combustion barrier material located in said housing, said combustion barrier material being permeable to the mixture of gases in said container.

10. An apparatus as set forth in claim 8 wherein said combustion arrestor includes means for blocking propagation of the combustion reaction into said container, said means for blocking being permeable to said mixture of gases in said container.

11. An apparatus as set forth in claim 8 further including a burst disk for blocking flow from said container, said burst disk being disposed between said combustion arrestor and an end portion of said manifold plug.

12. An apparatus as set forth in claim 11 further including means for rupturing said burst disk to release the mixture of gases from said container to inflate the vehicle occupant restraint.

13. An apparatus as set forth in claim 9 wherein said barrier material comprises stainless steel wool or stainless steel mesh.

14. A method of inflating a vehicle occupant restraint such as an air bag, said method comprising the steps of:

receiving in a container a mixture of gases including a primary gas for inflating the vehicle occupant restraint and a combustible gas;

directing the mixture of gases from the container toward the vehicle occupant restraint;

igniting the combustible gas as it flows toward the vehicle occupant restraint to create a combustion reaction external to the container and past which the primary gas flows; and substantially containing the combustion reaction external to the container to minimize the propagation of the combustion reaction into the container.

15. A method as defined in claim 14 further including the step of storing the mixture of gases in the container.

16. A method as set forth in claim 15 further including the step of sensing the occurrence of sudden vehicle deceleration indicative of a collision and performing said step of igniting the combustible gas in response to sensing the occurrence of said sudden vehicle deceleration.

17. A method as set forth in claim 15 wherein said step of substantially containing the combustion reaction external to the container includes providing a combustion barrier material permeable to the mixture of gases and directing the gases through the barrier material into the manifold and toward the vehicle occupant restraint and containing at least a portion of the combustion reaction in the barrier material.

18. A method as set forth in claim 15 further including the step of directing the primary gas through and past the combustion reaction as the primary gas flows to inflate the vehicle occupant restraint.

19. A method as set forth in claim 15 wherein said step of storing the mixture of gases includes storing the mixture of gases at about 2000 psi in the container.

20. An apparatus for inflating a vehicle occupant restraint such as an air bag, said apparatus comprising:

a container having a mixture of gases including a primary gas for inflating the air bag and a combustible gas;

means for directing the mixture of gases from the container toward the vehicle occupant restraint;

means for igniting the combustible gas as it flows toward the vehicle occupant restraint to create a combustion reaction external to said container past which the primary gas flows; and means for substantially containing the combustion reaction within said means for directing to minimize the propagation of the combustion reaction into the container.

21. An apparatus as set forth in claim 20 wherein said means for minimizing propagation of the combustion reaction into said container comprises a combustion arrestor having a combustion barrier material which is permeable to said mixture of gases.

22. An apparatus for inflating a vehicle occupant restraint such as an air bag, said apparatus comprising:

a container defining a chamber for storing a mixture of gases under pressure including a primary gas for inflating the vehicle occupant restraint and a combustible gas which, when ignited, heats the primary gas, said container having an opening through which gas can flow to inflate the air bag;

a closure extending across the opening in the container to block the flow of gas from the chamber through the opening;

a manifold attached to said container and located in the opening for directing the mixture of gases from the chamber toward the vehicle occupant restraint;

an initiator located in said manifold for igniting the combustible gas as it flows toward the vehicle occupant restraint to create a combustion reaction external to said container past which the primary gas flows, said initiator including a movable member, ignitable material, and a tube fixed to the manifold for housing a portion of said member and said ignitable material in said tube;

said member including a piston portion, an end portion extendable outside of said tube and a passage, in response to ignition of said ignitable material said piston portion moves in said tube and said end portion engages and ruptures said closure, combustion products flow through the passage in said member to initiate the combustion reaction of the combustible gas flowing through the opening and said manifold; and a combustion arrestor supported in a housing and located in the chamber adjacent the opening for substantially containing the combustion reaction within said manifold to minimize the propagation of the combustion reaction into the chamber, said housing attached to said manifold to engage opposite sides of said closure to retain said closure extending across the opening.

* * * * *